Feb. 17, 1959     H. J. L. VAN KUYK     2,873,607

DEVICE FOR MEASURING A PHYSICAL QUANTITY

Filed Dec. 6, 1954

INVENTOR
HENRICUS JOSEPHUS LOUIS VAN KUYK

BY *Fred M. Vogel*
AGENT

United States Patent Office 2,873,607
Patented Feb. 17, 1959

2,873,607

DEVICE FOR MEASURING A PHYSICAL QUANTITY

Henricus Josephus Louis van Kuyk, Emmasingel, Eindhoven, Netherlands, assignor, by mesne assignments, to North American Philips Company, Inc., New York, N. Y., a corporation of Delaware Application December 6, 1954, Serial No. 473,343

Claims priority, application Netherlands December 17, 1953

8 Claims. (Cl. 73—335)

The present invention concerns devices for measuring a physical quantity.

It is well known to measure physical quantities by means of an automatic balancing device in which in a balancing circuit a known voltage which is taken from a potentiometer balances an electric voltage dependent upon the quantity. These devices generally comprise an amplifier for amplifying the residual voltage present in the circuit, which amplifier controls a motor which drives the sliding contact of the potentiometer in a sense such that the residual voltage is reduced to zero value. The position of the sliding contact of the potentiometer is a measure of the value of the quantity required to be measured and may be read from a graduated scale.

As an alternative to a resistance potentiometer having a sliding contact, a capacitive or inductive voltage divider may be used for balance. Such a capacitive voltage divider may consist of two series-connected capacitors the capacitances of which are varied in opposite senses by a driving member. A serviceable inductive voltage divider may consist of two series-connected coaxial coils in which a common core made of ferromagnetic material is displaced by the adjusting member in a manner such that the inductances vary in opposite senses. For the sake of simplicity hereinafter it will be generally assumed that use is made of resistance potentiometers comprising sliding contacts although the invention is not limited thereto.

The voltage dependent upon the quantity to be measured may be derived therefrom with the aid of a variety of transducers. If, for example, the quantity is a temperature, use may be made of a thermocouple which directly produces a voltage, or of a resistance thermometer which is included in a bridge arrangement of resistors which is connected to a constant supply voltage. If the quantity is a mechanical tension or a pressure, use may be made of so-called stress strips. Stress strips are resistors the resistance value of which substantially depends on the stress or the pressure exerted upon the resistance material and which are secured to a structural element the tension in which is measured or which are influenced by the pressure to be measured in some other manner. These stress strips are also included in a bridge arrangement connected to a constant supply voltage. The output voltage of the bridge is balanced by a known voltage.

The relative humidity of the atmosphere may be measured by means of a dew-point hygrometer. In this case also, it is known to convert the quantity to be measured into an electric voltage. In one embodiment of such an arrangement use is made of an element comprising two electrodes between which a solution of a certain hygroscopic material, more particularly lithium chloride, is provided, this solution being heated by an electric current flowing between the electrodes. Thus the solvent is evaporated by the produced current heat until the dry material is left which is no longer electrically conductive. Thereupon the temperature drops so that the material again absorbs humidity from the air. A balance temperature is produced which depends upon the absolute humidity of the air and which generally is measured by carrying out the above described balance method by means of a resistance thermometer which forms part of a bridge arrangement.

The advantages of the automatic balance method for measuring various physical quantities are that the measurement is carried out substantially without consumption of current, the force by which the pointer is driven is substantially unlimited, the scale is readily readable and the measured quantity may be recorded in a simple manner.

The scale graduation generally varies in substantially linear relationship with the voltage operative in the balancing circuit, which voltage is derived from the quantity to be measured. If this voltage is also proportional to the value of the quantity, a scale is obtained which is in linear relationship with the quantity to be measured, which generally is desired. However, the voltage derived from the quantity to be measured frequently depends upon said quantity in a more complicated manner so that, when the described balance method is used, the scale graduation is not in linear relationship with said quantity and in many cases becomes unclear. Even when the voltage is proportional to the value of the quantity to be measured, a scale graduation is frequently desired which differs from linearity. The present invention provides means to obtain a more advantageous scale in these cases.

A quantity to be measured may also be related to two or more further mutually independent quantities according to a definite function, thus preventing a single voltage from being directly derived from it by carrying out the method described, said voltage may be balanced by means of a known voltage. In this event, the mutually independent quantities could be measured separately according to the described balance method and the required quantity could be derived from the ascertained values. However, this is laborious and difficult, if a recording of the said quantity is also required. The device of the present invention may also be used in this event to measure the required quantity directly.

The invention starts from a device for measuring a physical quantity in which an electric voltage dependent upon the quantity to be measured is balanced in a balancing circuit by a known voltage derived from a potentiometer; the residual voltage operative in the circuit acts as a control voltage controlling an adjusting member by means of which the control member of the potentiometer is displaced until the residual voltage is substantially equal to zero. In the device of the present invention only a fraction of a voltage derived from the physical quantity to be measured is operative in the balancing circuit; said fraction is determined by the adjustment of the control member of the potentiometer.

Preferably of the said voltage derived from the physical quantity to be measured, only a fraction which is proportional to or at least in linear relationship with the displacement of the control member of the potentiometer from the zero position, is operative in the balancing circuit. In a simple embodiment of a device in accordance with the invention, provision may be made of a mechanical coupling between the control member of the potentiometer and the control member of a second potentiometer from which the voltage derived from the physical quantity to be measured is taken.

If in such devices the voltage derived from the quantity required to be measured varies in linear relationship with said quantity, the scale graduation will nevertheless not be linear. Conversely, a more linear scale graduation may be obtained if the said voltage varies in non-linear relationship with said quantity according to a definite function.

Generally, it is desirable for a fraction of a voltage dependent upon the physical quantity to be measured also to be operative in the balancing circuit; said fraction is independent of the position of the sliding contact of the first potentiometer.

When a physical quantity related to two other physical quantities according to a definite, generally non-linear, function is measured, according to the invention at least two voltages are operative in the balancing circuit; a fraction dependent upon the adjustment of the balancing potentiometer of a voltage derived from one of these quantities being operative in the balancing circuit.

In order that the invention may be readily carried into effect, it will now be explained with reference to the accompanying drawing, in which.

Figure 1:
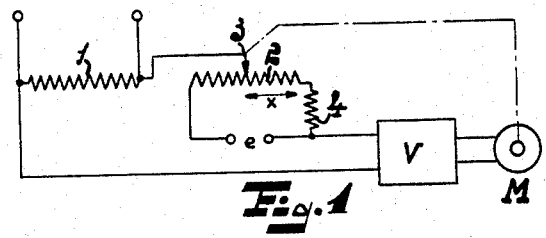
Fig. 1 is a schematic diagram of a simple embodiment of a device for measuring a physical quantity including an automatic balancing circuit, as known in the art.

In Fig. 1 an impedance across which a potential is produced, which is derived from the quantity to be measured, is designated 1. The impedance 1 may, for example, be the diagonal of a bridge arrangement, the arms of which are constituted by resistors. When a temperature is required to be measured, one of the resistors of the bridge arrangement may be a resistance thermometer, that is, a resistor having a comparatively high positive or negative temperature coefficient. The other diagonal of the bridge arrangement may be connected to a very constant voltage, preferably an alternating voltage. The voltage set up across the impedance 1 varies in substantially linear relationship with the temperature, when this temperature does not vary excessively.

The impedance 1 is included in a circuit which also includes a variable part of a potentiometer 2 and a constant resistor 4. The potentiometer resistor 2 and the resistor 4 are connected in series to a voltage supply $e$ which has the same frequency and phase as the said supply source supplying the bridge, but otherwise is completely independent thereof. Only a part $x$ of the potentiometer resistor 2 is included in the circuit.

The voltages operative in the circuit counteract each other. The difference potential is applied to the input circuit of an amplifier V, the output circuit of which controls a phase-sensitive motor M. The motor M acts to drive the sliding contact 3 of the potentiometer 2, the arrangement being such that the motor tends to balance the two voltages operative in the circuit. When this balance is attained, no voltage is present in the amplifier output circuit and the motor M stops.

The position of the sliding contact 3 depends upon the value of the voltage produced across the resistor 1 and consequently is a measure of the quantity required to be measured, which may be read from a scale associated with the potentiometer resistor 2. In many cases, the resistor 4 is required in order to obtain an advantageous scale graduation, but in other cases it may be omitted. The scale graduation is in substantially linear relationship with the quantity to be measured.

Figure 2:
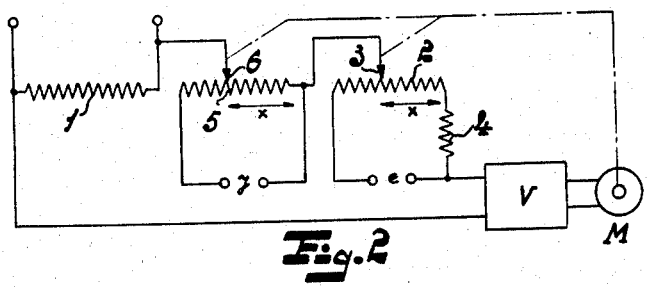
Fig. 2 is a schematic diagram of an embodiment of the device for measuring a physical quantity of the present invention.

In Fig. 2, the linear relationship of the scale graduation and the quantity to be measured is no longer present. The circuit arrangement of Fig. 2 differs from that of Fig. 1 in that the balancing circuit also includes a part of a potentiometer 5, which part is determined by the position of a sliding contact 6. To the potentiometer 5 a voltage is applied, which is derived from the quantity required to be measured; for example, similarly to the voltage set up across the impedance 1, so that these voltages are proportional to each other. The sliding contact 6 is coupled mechanically to the sliding contact 3 and both said sliding contacts are driven by the motor M. Preferably, this is effected in a manner such that a part $x$ of the potentiometer 5 is also included in the balancing circuit.

If, now, the value of the quantity required to be measured at a given instant is assumed to be $p$, it may be assumed that the voltage across the impedance 1 is $a \cdot p$ and that across the potentiometer 5 is $b \cdot p$. Only a part $x$ of the latter is connected in the circuit. When the voltage across the resistor 4 is designated $e_0$, with complete balance:

$$ap - bp \cdot x - (e - e_0) \cdot x - e_0 = 0$$

From this it follows for the indication:

$$x = \frac{ap - e_0}{bp + e - e_0}$$

A suitable choice of the various quantities $a$, $b$, $e$, and $e_0$ permits the adapting of the scale graduation of the potentiometer 2 to widely different requirements.

If the voltages across the impedances 1 and 5 do not vary in linear relationship with the quantity to be measured, a suitable choice of the various elements of the circuit arrangement permits the obtaining of a scale graduation which is substantially in linear relationship with, or proportional to, the quantity to be measured.

The invention is of specific importance if the physical quantity required to be measured, or to be recorded, is related to two other physical quantities according to a definite, more particularly a non-linear, function.

In this event, a voltage is derived in known manner from each of said quantities; a known voltage derived from a potentiometer balancing these voltages in a single circuit in the above-described manner.

Figure 3:
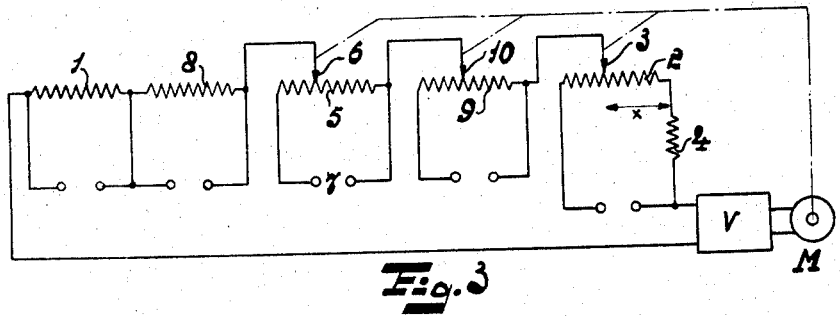
Fig. 3 is a schematic diagram of another embodiment of the device for measuring a physical quantity of the present invention.

Fig. 3 is a general embodiment of the principle of such a circuit arrangement. The balancing circuit includes, in addition to the impedance 1 and part of the impedances 5 and 2, an impedance 8 and a part of an impedance 9, which part is determined by the position of a sliding contact 10. Across the impedances 1, 5 and 2, the same voltages are produced as in the arrangement shown in Fig. 2. Across the impedance 8, and also across the impedance 9, a voltage is produced which is derived from the second physical quantity. The impedance 8 may be the diagonal of a bridge arrangement in which certain arms are constituted by resistors which are influenced by said second physical quantity. The impedances 1 and 8 may, as an alternative, be replaced by a single bridge diagonal, certain resistors of the bridge being influenced by the one quantity and other resistors by the other.

The sliding contact 10 may be mechanically coupled to the sliding contacts 3 and 6 with the result that all three contacts are driven by the motor M in the same sense. The arrangement may, in this event, be such that at all times a part $x$ of the resistor 9 also is included in the circuit.

If said first physical quantity is designated $p$ and said second one is designated $q$, it follosw that with complete balance:

$$ap + bq + cpx + dqx - ex - e_0 = 0$$

$a$, $b$, $c$ and $d$ are coefficients which may be either positive or negative. From this relation follows:

$$x = \frac{ap + bq - e_0}{cp + dq - e}$$

Frequently it will be possible for the constants $a$, $b$, $c$, $d$, $e_0$ and $e$ to be such that sufficient conformity is obtained to the function determining the relationship between the quantity required to be measured and the other two quantities so that the value $x$ may serve as a measure of the desired quantity with sufficient approximation.

At least one of the constants $a$, $b$, $c$, $d$ or $e_0$ may be equal to zero.

It has been found that the invention is directly suited to the measurement of the relative humidity of the air by means of a dew-point meter and a thermometer measuring the ambient temperature. The dew-point meter may be of the kind described in the opening part, the voltage required to be introduced into the balancing circuit being taken from a resistance thermometer the resistance of which varies approximately in linear relationship with the dew-point temperature required to be measured. The ambient temperature also may be measured by means of a resistance thermometer.

The relative humidity is a comparatively complicated function of the dew-point temperature and the ambient temperature. For a limited temperature range, of for example from 10 to 40° C., the following relation may be assumed with satisfactory approximation:

$$V = (t_d - t_k)\{a - b \cdot (t_k - t_0)\}$$

$V$ is the function of the relative humidity, $t_d$ the dew-point temperature, $t_k$ the ambient temperature, $t_0$ a constant which may be assumed to be equal to the temperature prevailing in the mid-point of the temperature range to which the above relation applies, and $a$ and $b$ are constants.

The above relation may be easily read directly from a scale by means of a circuit arrangement of the kind shown in Fig. 3.

Figure 4:
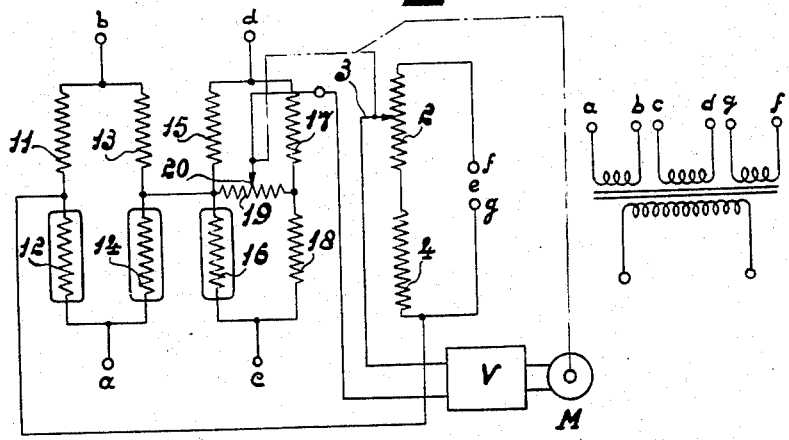
Fig. 4 is a schematic diagram of still another embodiment of the device for measuring a physical quantity of the present invention.

This may be effected by the embodiment of Fig. 4, in which use is made of two bridge circuits, the first of which consists of resistors 11, 12, 13 and 14 and the second of which consists of resistors 15, 16, 17 and 18. The first bridge circuit may be regarded as the main bridge and the second as a correcting bridge. One diagonal of the first bridge is included in the balancing circuit; the other diagonal between the points $a$ and $b$ is connected, in the manner shown at the right hand side of Fig. 4, to a secondary transformer winding the primary of which is supplied by an alternating voltage power supply. The horizontal diagonal of the second bridge consists of a potentiometer 19. This bridge is supplied at points $c$ and $d$ by a second secondary of the said transformer. Only a fraction of the diagonal voltage across the resistor 19, determined by the position of the sliding contact 20, is operative in the balancing circuit. In addition, this circuit contains a voltage set up across the resistor 4 and a part of the resistor 2, which part is again determined by the position of the sliding contact 3 which is driven by the motor M. The series connection of the resistors 2 and 4 is connected to a voltage taken from terminals $g$ and $f$ of a third secondary of the supply transformer. It is assumed that the contacts 3 and 20 are mechanically coupled so that at all times the part $x$ of the resistances 2 and 19 is connected in the balancing circuit.

In addition, it is assumed that the resistor 12 is also the resistance thermometer of the dew-point transducer and the resistor 14 that of the ambient temperature transducer, while the resistor 16 is a second resistance thermometer for the ambient temperature. It is also assumed that:

$U_h$ = the voltage across the horizontal diagonal of the first bridge,
$U_c$ = the voltage across the horizontal diagonal of the second bridge,
$U_1$ = the voltage across the resistor 4,
$U_2$ = the voltage between $g$ and $f$, and
$U_t$ = the voltage between the sliding contact 3 and the point $g$.

$U_h$ and a variable fraction of $U_c$ are subtracted from one another and balanced by the voltage across the measuring potentiometer 2. From the circuit arrangement, it is seen that:

$$U_h - U_c \cdot \frac{U_t - U_1}{U_2 - U_1} = U_t$$

Hence:

$$U_t - U_1 = \frac{U_h - U_1}{1 + \frac{U_c}{U_2 - U_1}}$$

$U_h - U_1$ is approximately $= C_1(t_d - t_k)$ where $C_1$ is a constant. In addition, $$U_c = C_2(t_k - t_0)$$

where $C_2$ is a constant, while:

$$V = U_t - U_1; \; U_2 - U_1 = C_3$$

Hence:

$$V = \frac{C_1 \cdot (t_d - t_k)}{1 + \frac{C_2(t_k - t_0)}{C_3}}$$

If, now it is assumed that $C_2/C_3C_1 = C_4$:

$$V = \frac{t_d - t_k}{\frac{1}{c_1} + C_4(t_k - t_0)}$$

Since $$C_4(t_k - t_0) < \frac{1}{c_1}$$

as a first approximation one may write:

$$V = (t_d - t_k)\left\{\frac{1}{c_1} - C_4(t_k - t_0)\right\}$$

This is exactly the formula expressing the relative humidity. Consequently, this can be directly read from a scale associated with one of the potentiometers.

Several approximations are used; however, by choosing suitable values these approximations may be used with advantage to compensate the natural non-linearity of the dew-point and ambient temperature transducers.

While the invention has been described by means of specific examples and in specific embodiments, I do not wish to be limited thereto, for obvious modifications will occur to those skilled in the art without departing from the spirit and scope of the invention.

What is claimed is:

1. A device for measuring a physical quantity comprising means for deriving a first voltage dependent upon the magnitude of said physical quantity, means for deriving a second voltage dependent upon the magnitude of said physical quantity, means for varying the amplitude of said second voltage comprising a first potentiometer having a control member, means for producing a reference voltage, means for varying the amplitude of said reference voltage comprising a second potentiometer having a control member, means for combining the said variable second and reference voltages with said first voltage thereby to produce a difference voltage, an electrically energized adjusting member coupled to the said control members of said first and second potentiometers and means responsive to said difference voltage for applying said difference voltage to said adjusting member to displace the control members of said first and second potentiometers to positions at which said difference voltage is substantially zero, the extent of the adjustment of the control member of either of said potentiometers constituting the measurement of said physical quantity.

2. A device as claimed in claim 1, wherein said first voltage varies in a linear relationship with said physical quantity.

3. A device for measuring a physical quantity dependent upon two other physical quantities according to a given function comprising means for deriving a first voltage dependent upon the magnitude of one of said two other physical quantities, means for deriving a second voltage dependent upon the magnitude of the other of said two other physical quantities, means for deriving a third voltage dependent upon the magnitude of said one of said two other physical quantities, means for deriving a fourth voltage dependent upon the magnitude of said other of said two other physical quantities, means for varying the amplitude of said third voltage comprising a first potentiometer having a control member, means for varying the amplitude of said fourth voltage comprising a second potentiometer having a control member, means for producing a reference voltage, means for varying the amplitude of said reference voltage comprising a third potentiometer having a control member, means for combining said variable third and fourth and reference voltages with said first and second voltages thereby to produce a difference voltage, an electrically energized adjusting member coupled to the said control members of said first and second and third potentiometers and means responsive to said difference voltage for applying said difference voltage to said adjusting member to displace the control members of said first and second and third potentiometers to positions at which said difference voltage is substantially zero, the extent of the adjustment of the control member of any of said potentiometers constituting the measurement of said physical quantity.

4. A device for measuring a relative humidity dependent upon dew point and ambient temperature comprising a first bridge circuit for deriving a first voltage dependent upon the magnitudes of said dew point and ambient temperature, said first bridge circuit comprising a first resistance thermometer for deriving a voltage dependent upon the magnitude of said dew point and a second resistance thermometer for deriving a voltage dependent upon the magnitude of said ambient temperature, a second bridge circuit for deriving a second voltage dependent upon the magnitude of said ambient temperature, said second bridge circuit comprising a third resistance thermometer for deriving said second voltage, means for varying the amplitude of said second voltage comprising a first potentiometer having a control member, means for producing a reference voltage, means for varying the amplitude of said reference voltage comprising a second potentiometer having a control member, means for combining the said variable second and reference voltages with said first voltage thereby to produce a difference voltage, an electrically energized adjusting member coupled to the said control members of said first and second potentiometers and means responsive to said difference voltage for applying said difference voltage to said adjusting member to displace the control members of said first and second potentiometers to positions at which said difference voltage is substantially zero, the extent of the adjustment of the control member of either of said potentiometers constituting the measurement of said relative humidity.

5. A device for measuring a physical quantity dependent upon two other physical quantities according to a given non-linear function, comprising means for deriving a first voltage dependent upon the magnitude of one of said two other physical quantities, means for deriving a second voltage dependent upon the magnitude of the other of said two other physical quantities, means for deriving a third voltage dependent upon the magnitude of said one of said two other physical quantities, means for deriving a fourth voltage dependent upon the magnitude of said other of said two other physical quantities, means for varying the amplitude of said third voltage comprising a first potentiometer having a control member, means for varying the amplitude of said fourth voltage comprising a second potentiometer having a control member, means for producing a reference voltage, means for varying the amplitude of said reference voltage comprising a third potentiometer having a control member, means for combining said variable third and fourth and reference voltages with said first and second voltages thereby to produce a difference voltage, an electrically energized adjusting member coupled to the said control members of said first and second and third potentiometers and means responsive to said difference voltage for applying said difference voltage to said adjusting member to displace the control members of said first and second and third potentiometers to positions at which said difference voltage is substantially zero, the extent of the adjustment of the control member of any of said potentiometers constituting the measurement of said physical quantity.

6. A device for measuring a physical quantity dependent upon two other physical quantities according to a given non-linear function, said first-mentioned physical quantity being relative humidity, one of said two other physical quantities being dew point temperature and the other of said two other physical quantities being ambient temperature, comprising means for deriving a first voltage dependent upon the magnitude of one of said two other physical quantities, means for deriving a second voltage dependent upon the magnitude of the other of said two other physical quantities, means for deriving a third voltage dependent upon the magnitude of said one of said two other physical quantities, means for deriving a fourth voltage dependent upon the magnitude of said other of said two other physical quantities, means for varying the amplitude of said third voltage comprising a first potentiometer having a control member, means for varying the amplitude of said fourth voltage comprising a second potentiometer having a control member, means for producing a reference voltage, means for varying the amplitude of said reference voltage comprising a third potentiometer having a control member, means for combining said variable third and fourth and reference voltages with said first and second voltages thereby to produce a difference voltage, an electrically energized adjusting member coupled to the said control members of said first and second and third potentiometers and means responsive to said difference voltage for applying said difference voltage to said adjusting member to displace the control members of said first and second and third potentiometers to positions at which said difference voltage is substantially zero, the extent of the adjustment of the control member of any of said potentiometers constituting the measurement of said physical quantity.

7. A device for measuring a physical quantity dependent upon two other physical quantities according to a given non-linear function, said first-mentioned physical quantity being relative humidity, one of said two other physical quantities being dew point temperature and the other of said two other physical quantities being ambient temperature, comprising means including a resistance thermometer for deriving a first voltage dependent upon the magnitude of one of said two other physical quantities, means including a resistance thermometer for deriving a second voltage dependent upon the magnitude of the other of said two other physical quantities, means for deriving a third voltage dependent upon the magnitude of said one of said two other physical quantities, means for deriving a fourth voltage dependent upon the magnitude of said other of said two other physical quantities, means for varying the amplitude of said third voltage comprising a first potentiometer having a control member, means for varying the amplitude of said fourth voltage comprising a second potentiometer having a control member, means for producing a reference voltage, means for varying the amplitude of said reference voltage comprising a third potentiometer having a control member, means for combining said variable third and fourth and reference voltages with said first and second voltages thereby to produce a difference voltage, an electrically energized adjusting member coupled to the said control members of said first and second and third potentiometers and means responsive to said difference voltage for applying said difference voltage to said adjusting member to displace the control members of said first and second and third potentiometers to positions at which said difference voltage is substantially zero, the extent of the adjustment of the control member of any of said potentiometers constituting the measurement of said physical quantity.

8. A device for measuring a physical quantity dependent upon two other physical quantities according to a given non-linear function, said first-mentioned physical quantity being relative humidity, one of said two other physical quantities being dew point temperature and the other of said two other physical quantities being ambient temperature, comprising means for deriving a first voltage dependent upon the magnitude of one of said two other physical quantities, said means comprising a bridge circuit including a resistance thermometer, means for deriving a second voltage dependent upon the magnitude of the other of said two other physical quantities, said last-mentioned means comprising a bridge circuit including a resistance thermometer, means for deriving a third voltage dependent upon the magnitude of said one of said two other physical quantities, means for deriving a fourth voltage dependent upon the magnitude of said other of said two other physical quantities, means for varying the amplitude of said third voltage comprising a first potentiometer having a control member, means for varying the amplitude of said fourth voltage comprising a second potentiometer having a control member, means for producing a reference voltage, means for varying the amplitude of said reference voltage comprising a third potentiometer having a control member, means for combining said variable third and fourth and reference voltages with said first and second voltages thereby to produce a difference voltage, an electrically energized adjusting member coupled to the said control members of said first and second and third potentiometers and means responsive to said difference voltage for applying said difference voltage to said adjusting member to displace the control members of said first and second and third potentiometers to positions at which said difference voltage is substantially zero, the extent of the adjustment of the control member of any of said potentiometers constituting the measurement of said physical quantity.

References Cited in the file of this patent

UNITED STATES PATENTS

| | | |
|---|---|---|
| 2,113,436 | Williams | Apr. 5, 1938 |
| 2,638,783 | Rittner et al. | May 19, 1953 |
| 2,673,465 | Goodman et al. | Mar. 30, 1954 |
| 2,707,880 | Wannamaker | May 10, 1955 |

FOREIGN PATENTS

| | | |
|---|---|---|
| 859,824 | Germany | Dec. 15, 1952 |